(12) United States Patent
Shanmugasundaram et al.

(10) Patent No.: US 10,049,625 B1
(45) Date of Patent: Aug. 14, 2018

(54) CONTEXT-BASED RENDERING

(71) Applicant: Amazon Technologies, Inc., Reno, NV (US)

(72) Inventors: Satishkumar Kothandapani Shanmugasundaram, Chennai (IN); Donghao Ma, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 63 days.

(21) Appl. No.: 15/386,991

(22) Filed: Dec. 21, 2016

(51) Int. Cl.
| | |
|---|---|
| *G09G 3/00* | (2006.01) |
| *G09G 3/34* | (2006.01) |
| *G09G 5/34* | (2006.01) |
| *G09G 5/373* | (2006.01) |
| *G09G 3/20* | (2006.01) |
| *G06F 3/0488* | (2013.01) |

(52) U.S. Cl.
CPC ........... *G09G 3/344* (2013.01); *G09G 3/2003* (2013.01); *G09G 5/34* (2013.01); *G09G 5/373* (2013.01); *G06F 3/04883* (2013.01); *G09G 2310/04* (2013.01); *G09G 2320/0666* (2013.01); *G09G 2320/08* (2013.01); *G09G 2340/04* (2013.01); *G09G 2354/00* (2013.01)

(58) Field of Classification Search
CPC .. G09G 3/344; G09G 3/2003; G09G 2354/00; G09G 2310/04; G09G 5/34; G09G 5/373; G09G 2320/0666; G09G 2320/08; G09G 2340/04; G06F 3/04883
See application file for complete search history.

(56) References Cited

U.S. PATENT DOCUMENTS

| | | | | |
|---|---|---|---|---|
| 8,325,149 | B2 * | 12/2012 | Sakai | G06F 3/1446 345/1.1 |
| 2013/0100026 | A1 * | 4/2013 | Vitsnudel | G06F 3/042 345/168 |
| 2015/0077323 | A1 * | 3/2015 | Ramaswamy | G06F 3/012 345/156 |

\* cited by examiner

*Primary Examiner* — Muhammad N Edun
(74) *Attorney, Agent, or Firm* — Hogan Lovells US LLP

(57) ABSTRACT

Various approaches discussed herein provide for changing the behavior and/or display properties of various interface elements associated with an application executing on a computing device, such as a device having an electrophoretic ink (e-ink) display screen. According to various embodiments, one or more libraries having E-ink specific parameters are provided that are used to modify the various interface elements based upon such information as a type and/or style of interface element.

20 Claims, 11 Drawing Sheets

US 10,049,625 B1

CONTEXT-BASED RENDERING

BACKGROUND

Electronic displays are commonly used as screens or displays for a wide variety of electronic devices, including such consumer electronics such as televisions, computers (e.g., laptop computers, tablet computers), and handheld devices (e.g., e.g., cellular telephones, audio and video players, gaming systems, and so forth). Some electronic displays typically include a flat display panel in a relatively thin and low weight package that is suitable for use in a variety of mobile or wearable electronic devices. Electronic displays may include thousands (or millions) of picture elements known as pixels, which may be arranged into a number of rows and columns, and are used to render images onto the electronic display to be perceived by a user.

For example, one type of electronic display may include an electronic ink (E-ink) display. The E-ink display may be particularly useful in certain electronic reader (E-reader) electronic devices or certain wearable electronic devices due to its high brightness and contrast, wide viewing angle, and ultra-low power. For instance, to display a given shade (e.g., white, black, or gray) at a given pixel, the E-ink display may receive 4-bits of image data, which may correspond to 16 individual gray levels that the E-ink display may use to render images.

Yet the operating systems (OS) that run on E-reader electronic devices and/or wearable electronic devices are becoming increasingly graphical and animated to increase the user's visual experience and desirability. For example, the OS may include widgets, graphical transitions, animations, and other features that may be included to not only provide a user of the E-reader and/or wearable electronic device easier experience navigating certain applications, but also to increase and the user's visual experience while using the E-reader and/or wearable electronic device. However, because E-ink displays may include display hardware of lesser complexity (e.g., reduced numbers of pixels, passive matrices of pixels), the E-ink display may not be able to render the widgets, graphical transitions, animations, and other features. It may be useful to provide methods and systems to improve user visual desirability and visual effects in E-ink displays.

BRIEF DESCRIPTION OF THE DRAWINGS

Various embodiments in accordance with the present disclosure will be described with reference to the drawings, in which.

DETAILED DESCRIPTION

Figure 1:
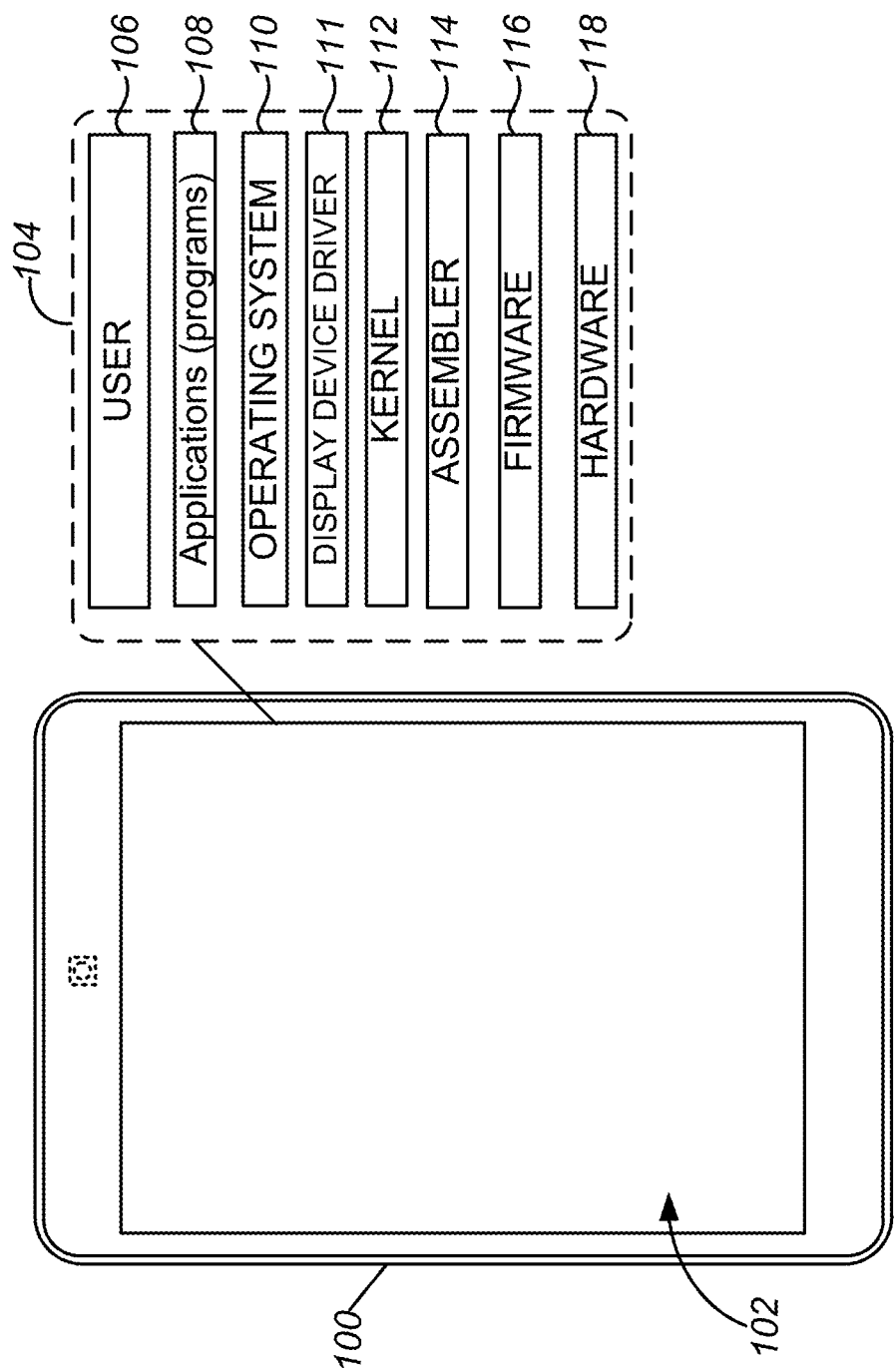
FIG. 1 illustrates an example electronic device including an electronic display and abstraction layers, in accordance with various embodiments.

Systems, devices and methods in accordance with various embodiments of the present disclosure may overcome one or more of the aforementioned and other deficiencies experienced in rendering, for example, widgets, graphical transitions, animations, and other features on electronic ink (E-ink) displays. In certain embodiments, the present techniques may include an operating system (OS) service system running on an electronic device and utilized to provide channels to communicate E-ink display specific parameters (e.g., waveforms, frame update modes, "wait for complete" flags, and so forth) to a display device driver. The E-ink display specific parameters may be used to adjust or transform certain unsupportable rendering aspects into E-ink rendering aspects, which include rendering aspects more suitable to be displayed on E-ink displays. The OS service system may also instruct the OS running on the electronic device to minimize the number of frame updates to E-ink display by consolidating necessary frame updates and skipping gratuitous frame updates (e.g., frame updates corresponding to certain unsupportable animations). The present embodiments may also include an applications framework that may be used to process and transform view attributes and widget style attributes into E-ink view attributes and widget style attributes that may be more suitable for display on an E-ink display. These techniques may increase user visual desirability and reduce or substantially prevent any possibility of image artifacts becoming apparent on the E-ink display.

According to various embodiments, an application or other process executing on an electronic device may cause an instruction (request, call, etc.) to be communicated to a display stack of the device, for example an instruction to draw an interface element on a display screen of the device. The interface element may be of a particular type, such as a widget, user interface control, E-book page, etc. The particular type of interface element may be limited to various types specified by an operating system of the device, for example, and the application may indicate the particular type of interface element in the instruction or in data associated with the instruction. The instruction may be received/detected/intercepted; for example, by a library stored on or otherwise in communication with the device. This may be accomplished according to known approaches, such as using a hook associated with the library to intercept particular function calls (e.g., instructions) from the application.

The instruction may correspond with the application desiring to cause an interface element to be displayed on the screen. As described further herein, the interface element may have a particular type; for example, a widget, a user interface control, an E-reader page, a list of information, etc. The particular type of interface element may be described in the instruction/request, and/or may be included in data associated with the instruction.

According to various embodiments, the instruction may cause the interface element to be refreshed or changed to a different state (e.g., in the event the interface element is already displayed) or otherwise initially displayed, for example being associated with a set of interface attributes/behavior parameters. These interface attributes/behavior parameters may comprise behaviors/actions that the interface element is capable of executing, such as scrolling a list of data, as well as ornamental design aspects, such as colors, sizes, etc. A indication of an interaction with the interface element may be determined; for example, a widget may be manipulated by a touch event on the screen (e.g., a swipe, press, long press, gesture, etc.), and in various embodiments the interaction (e.g., the touch event) associated with the interface element causes visual feedback on the screen, which visual feedback may be described by the interface attributes/behavior parameters.

According to various embodiments, in response to detecting the interaction (e.g., the touch event), a determination may be made whether a particular library (e.g., an E-ink library) is associated with the application. As described herein, the E-ink library may be a library of functions, values, or other data that is specific to displaying elements on an E-ink screen (e.g., E-ink display attributes such as waveforms, update modes, "wait for complete" flags, etc.). The type of interface element and the interface attributes, among other data, may be communicated (e.g., passed as variables or references, transmitted, etc.) to the E-ink library. In response, a subset of the E-ink display attributes (e.g., associated with the E-ink library) may be determined that correspond to the interface element. This determination may be made, for example, based on the type of interface element (e.g., an interface element of type "E-book Reader" may cause an E-ink display attribute associated with a waveform (e.g., REAGL) to be selected as part of the subset of E-ink display attributes).

Based on the subset of E-ink display attributes, for example, the interface attributes of the interface element may be modified (e.g., replaced, etc.). For example, the interface element may be of a widget type and be a button that initiates a behavior/visual feedback comprising an animation, which on an E-ink display, would not be displayed properly (e.g., would cause multiple refreshes of the display, cause ghosting or flashing, etc.). Upon receiving a touch event on the button, the E-ink library may cause the interface attribute/behavior parameter responsible for the animation to be replaced with or modified by an E-ink display attribute/parameter that eliminates the animation or drops frames off the animation, for example. The modified attributes are then communicated to the application and are applied to the interface element so it may be displayed on the E-ink screen.

According to various embodiments, the interface element may be of a type that would result in multiple updates to the display screen. For a non-E-ink screen, this would not be a detriment; however, as discussed herein, E-ink screen have particular characteristics and performance attributes that may not be optimal for fast and/or numerous display updates. An interface element may be determined to cause multiple display updates, and the library may in response identify an E-ink display attribute that corresponds to a single update, and modify the visual effect of the interface element to result in a single update (or fewer updates) for the interface element, such as when it is interacted with by a touch event, etc.

According to various embodiments, the interface element may comprise an element (e.g., a list view, etc.) that contains multiple "pages" of information, such as a scrollable view that has more information that can fit in the interface element. The interface element may include a "scrolling" visual effect where the data moves according to an interaction with the interface element, as is known in the art. A gesture to cause the scrolling of data, and the visual effect, may be determined (e.g., a touch gesture such as a "swipe" downwards, etc.), and a location in the multiple "pages" of information that corresponds to where the interaction would have caused the interface element to be "scrolled to" may be determined. For example, a list view may have five total pages of information, but only one page can fit in the interface element at a time. With a touch gesture, the interface element may be "scrolled" to the third page of information, such that the first page moves upwards until the second page is displayed, which then is moved upwards until the third "target" page is displayed. Using the techniques described herein, the scrolling effect of the interface element may be changed, for example to a "pagination" effect, such that the number of changed and/or updated frames may be minimized.

According to various embodiments, a full refresh of the screen may be triggered; for example, there may be a threshold number of times that the "scrolling" interaction may be activated without a full refresh being performed, and if that number is exceeded, then a full refresh may be caused. This is useful as a remedy for "ghosting" or "artifacts" being displayed.

According to various embodiments, an interface element may be associated with one or more colors or themes, which on an E-ink display, may not be able to be displayed in a faithful manner. A mapping may be determined, for example between one or more color values associated with the interface element and one or more E-ink parameters (e.g., waveforms, shades of grey, etc.), and the color value(s) may be modified by replacing and/or changing the interface attribute/behavior parameter responsible for the color(s). In an embodiment, an E-ink theme, such as a single data file comprising multiple values (e.g., shades of gray), may be determined to correspond to multiple color values associated with the interface element(s).

Accordingly, approaches in accordance with various embodiments improve the operation and performance of computing devices, such as those on which they are implemented by, among other advantages, offering an approach for modifying visual effects and functionality of interface elements that may cause performance issues and/or display issues on an E-ink display. Various other applications, processes, and uses are presented below with respect to the various embodiments, each of which improves the operation and performance of the computing device(s) on which they are implemented.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

As used herein, "waveform" may, in some embodiments, refer to a set of 2-bit values used to activate (e.g., turn "ON" or drive to substantially white) a pixel or deactivate a pixel (e.g., turn "OFF" or drive to substantially black) of an E-ink display. For example, the "waveform" may drive pixels of the E-ink display to white, gray or black, and may be used as part of frame updates to the E-ink display. Similarly, as used herein "update mode" may, in some embodiments, refer to a mode in which pixels of an E-ink display are instructed to be updated (e.g., refreshed). For example, when a waveform is generated and supplied, a partial frame update may be specified in which only certain lines or groups of pixels are updated (e.g., refreshed) or a full frame update mode in which an entire page or canvas of pixels are updated.

With the foregoing in mind, it may be useful to describe an electronic computing device that may include an operating system (OS) that supports graphical animations and transitions on electronic ink (e.g., E-ink) displays, such as an electronic computing device 100 depicted in FIG. 1. As illustrated in FIG. 1, in certain embodiments, the electronic computing device 100 may include, for example, a tablet computer, an e-reader, or any of various other mobile and/or personal electronic devices. As further illustrated, the electronic computing device 100 may include an electronic display 102. In certain embodiments, the electronic display 102 may be used to display various images (e.g., still images, video images) to, for example, a user of the electronic computing device 100. In one embodiment, the display 102 may include an electronic ink (e.g., E-ink) display. In other embodiments, the electronic display 102 may include an active matrix liquid crystal display (AMLCD), an active matrix organic light emitting diode (AMOLED) display, or other electronic display that may include, for example, a 4-bit (e.g., 16 individual gray levels or G16) electronic display.

In certain embodiments, the electronic computing device 100 may operate and be implemented, for example, in accordance with several abstraction layers 104. As depicted, the abstraction layers 104 may include a user layer 106, an applications layer 108, an operating system (OS) layer 110, a display device driver layer 111, a kernel layer 112, an assembler layer 114, a firmware layer 116, and a hardware layer 118. It should be appreciated that each of the layers 106-118 of the abstraction layers 104 may operate interpedently. For example, the user layer 106 may correspond to inputs received from a user of the electronic computing device 100 via one or more applications or programs (e.g., application layer 108) running on electronic computing device 100.

For example, the applications layer 108 may include, for example, various applications and programs (e.g., email, web browsers, applications program interfaces [APIs], graphical user interfaces [GUIs], and so forth) that may be running on electronic computing device 100. The OS layer 110 may include, for example, software useful in managing the various functions (e.g., executing programs and applications, scheduling tasks to perform, interfacing with peripheral devices, interfacing with the firmware layer 116 and the hardware layer 118, and so forth). As will be further appreciated, the OS layer 110 may include an OS service system useful in providing one or more channels (e.g., soft channels) to provide selective frame updates in support of certain image rendering aspects (e.g., screen orientation, transitions, animations, position, transforms, bounds, animations, views, widgets, and so forth) on, for example, an E-ink embodiment of the electronic display 102. In this way, the visual experience of a user of the electronic computing device 100 may be enriched.

In certain embodiments, a display device driver, for example as part of the display device driver layer 111, may be provided to implement one or more graphics rendering calls and/or various other functions. For example, the display device driver 111 may control and manage the manner in which each image is rendered on the electronic display 102. The kernel layer 112 may be included to, for example, provide a level of abstraction between the firmware layer 116 and the hardware layer 118 and the OS layer 110. For example, the kernel layer 112 may include certain hardware drivers (e.g., webcam drivers, mouse or touchpad drivers, display drivers, keyboard drivers, microphone drivers, speaker drivers, and so forth). Likewise, as further depicted in FIG. 1, the assembler layer may interface with the kernel layer 112 and the OS layer 110, and may include one or more assemblers or compilers useful in translating, for example, high-level computing languages into computer-executable instructions. As further depicted, the firmware layer 116 may include "built-in" software that may be used to program and/or reprogram certain components of the hardware layer 118. As may by appreciated, the hardware layer 118 may include, for example, one or more processors, one or more memory and/or storage components, the electronic display 102, and/or other electronic circuitry that may be used to support the various functions and operations of the electronic computing device 100.

Figure 2:
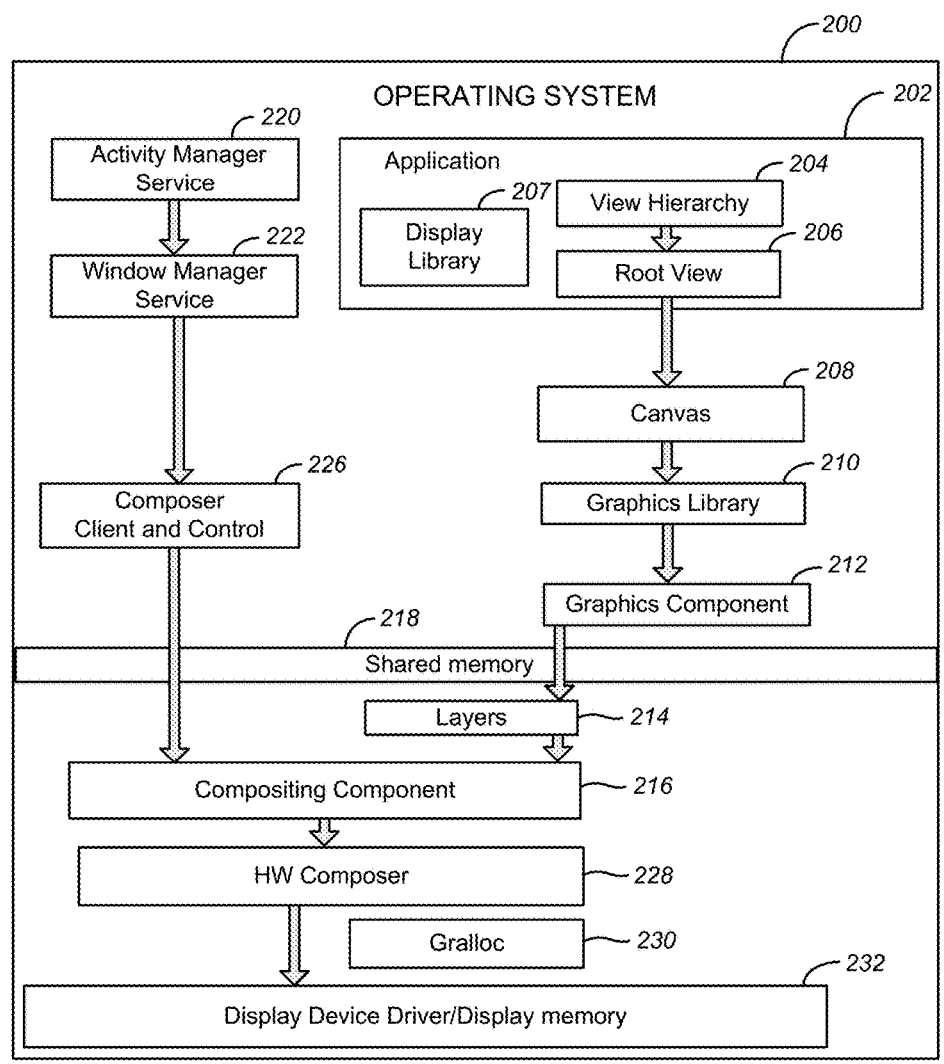
FIG. 2 illustrates an example operating system (OS) that may run on the electronic device of FIG. 1, in accordance with various embodiments.

Turning now to FIG. 2, a detailed example embodiment of an operating system (OS) 200, which included as part of the electronic computing device 100, is illustrated. It should be understood that reference numbers may be carried over between figures for similar components for purposes of explanation, but that such use should not be interpreted as a limitation on the various embodiments. In certain embodiments, as depicted in FIG. 2, the OS 200 illustrates the graphics rendering architecture of an OS suitable for supporting, for example, 4-bit (e.g., 16 individual gray levels or G16) electronic display such as the electronic display 102 as discussed above with respect to FIG. 1. For example, the OS 200 may include an application component 202, which may include a view hierarchy component 204 and a root view component 206 (e.g., "ViewRootlmpl"), and a service system display library component 207. In certain embodiments, the view hierarchy component 204 may make one or more function calls to the service system display library component 207, and may be provided to allow, for example, developers or users to optimize one or more GUIs of the function.

For example, the view hierarchy component 204 may provide a visual representation of the layout of the view hierarchy (e.g., Layout View function) and, in some embodiments, a magnified inspector of the display (e.g., Pixel Perfect View function). Similarly, the root view component 206 (e.g., "ViewRootlmpl") may be provided to trigger a rebuilding (and redrawing) of each of a number of display lists respectively generated by views of the view hierarchy of the view hierarchy component 204 in the case in which, for example, one or more views get invalidated due to user input events or certain animations.

In certain embodiments, as further depicted in FIG. 2, the application component 202 may pass information to a canvas component 208. The canvas component 208 may be provided to allow software developers or users to "draw"

(e.g., render graphics) images on the electronic display 102, for instance. For example, the canvas component 208 may include hardware acceleration for canvas APIs (e.g., Canvas 2D, Canvas 3D) using certain drawing libraries (e.g., OpenGLRenderer) that translates canvas operations (e.g., "drawing" of images or animation graphics) to OpenGL operations to be executed on, for example, one or more processors of the electronic computing device 102. As further depicted in FIG. 2, the canvas component 208 may pass canvas rendering data (e.g., image drawings) to a graphics library component 210.

In certain embodiments, the graphics library component 210 (e.g., SKIA) may include a software rendering system that may be provided to generate a bitmap of the canvas graphics rendering data (e.g., image data). The graphics library component 210 may then pass the generated bitmap to a graphics component 212. The graphics component 212 may include a software system that may be useful if producing a one or more buffer queues, which may be provided to couple the canvas component 208 and graphics library component 210 (e.g. which generates buffers of graphics rendering data) to, for example, a compositing component 216 (e.g., "SurfaceFlinger") via a layer component(s) 214. Specifically, the compositing component 216 may receive (e.g., consume) the graphics rendering data for display on, for example, the electronic display 102 or for further processing. In another embodiment, the graphics component 212 may store the graphics rendering data to a shared memory component 218.

In certain embodiments, the compositing component 216 may also receive one or more additional inputs including, for example, other buffers of graphics rendering data. For example, as further illustrated in FIG. 2, the OS 202 may also include an activity manager service component 220, a window manager service component 222, a surface control component 224 (e.g., "SurfaceControl"), and a surface composer client component 226 (e.g., "SurfaceComposerClient"). In some embodiments, the activity manager service component 220 may be provided to pass graphics rendering data to onto one or more first "surfaces" of what may be consider as the producer portion of a buffer queue to ultimately be consumed by compositing component 216 (e.g., "SurfaceFlinger").

The window manager service component 222 may include a service system component that may be used to control a window, which may be a container for various views and may be supported by at least one surface. For example, in some embodiments, the window manager service component 222 may be useful in overseeing, for example, lifecycles, input and focus events, display screen orientation, transitions, animations, position, transforms, z-order, as well as various other aspects of a particular window. In some embodiments, the window manager service component 222 may pass all of the window metadata to the compositing component 216 (e.g., "SurfaceFlinger") via the surface control component 224 and the surface composer client component 226 (e.g., "SurfaceComposerClient"). The compositing component 216 (e.g., "SurfaceFlinger") may then utilize the window metadata to composite surfaces on, for example, the electronic display 102.

In certain embodiments, as further depicted in FIG. 2, the compositing component 216 (e.g., "SurfaceFlinger") may delegate certain composition processing tasks to a hardware composer component 228 (e.g., "HW Composer") in order to, for example, offload work from the one or more processors of the electronic computing device 100. For example, in some embodiments, the hardware composer component 228 (e.g., "HW Composer") may perform at least half of the processing tasks. The hardware composer component 228 (e.g., "HW Composer") may also support various events such as, for example, vertical synchronization (e.g., VSYNC) signals, which may signal the beginning of a frame update (e.g., a display refresh).

Similarly, as further depicted by FIG. 2, a graphics memory allocator component 230 (e.g., "Gralloc") may be provided to allocate memory or frame buffer space requested by image producers such as the canvas component 208. For example, the graphics memory allocator component 230 (e.g., "Gralloc") may be provided to allocate memory or frame buffer space as part of the display device driver/display memory component 232.

In certain embodiments, the display device driver/display memory component 232 may be provided to implement the graphics rendering calls or other functions. For example, the display device driver/display memory component 232 may control and manage the manner in which each image is rendered on the electronic display 102. As may be appreciated, in some embodiments, certain image rendering aspects (e.g., screen orientation, transitions, animations, position, transforms, and so forth) may be dependent upon the electronic display 102. For example, for an E-ink embodiment of the electronic display 102, the frequent refreshes and frame updates useful in executing certain image rendering aspects (e.g., screen orientation, transitions, animations, position, transforms, bounds, animations, widgets, and so forth) may not be readily supported because consequence of the simplified hardware of an E-ink embodiment of the electronic display 102.

Figure 3A:
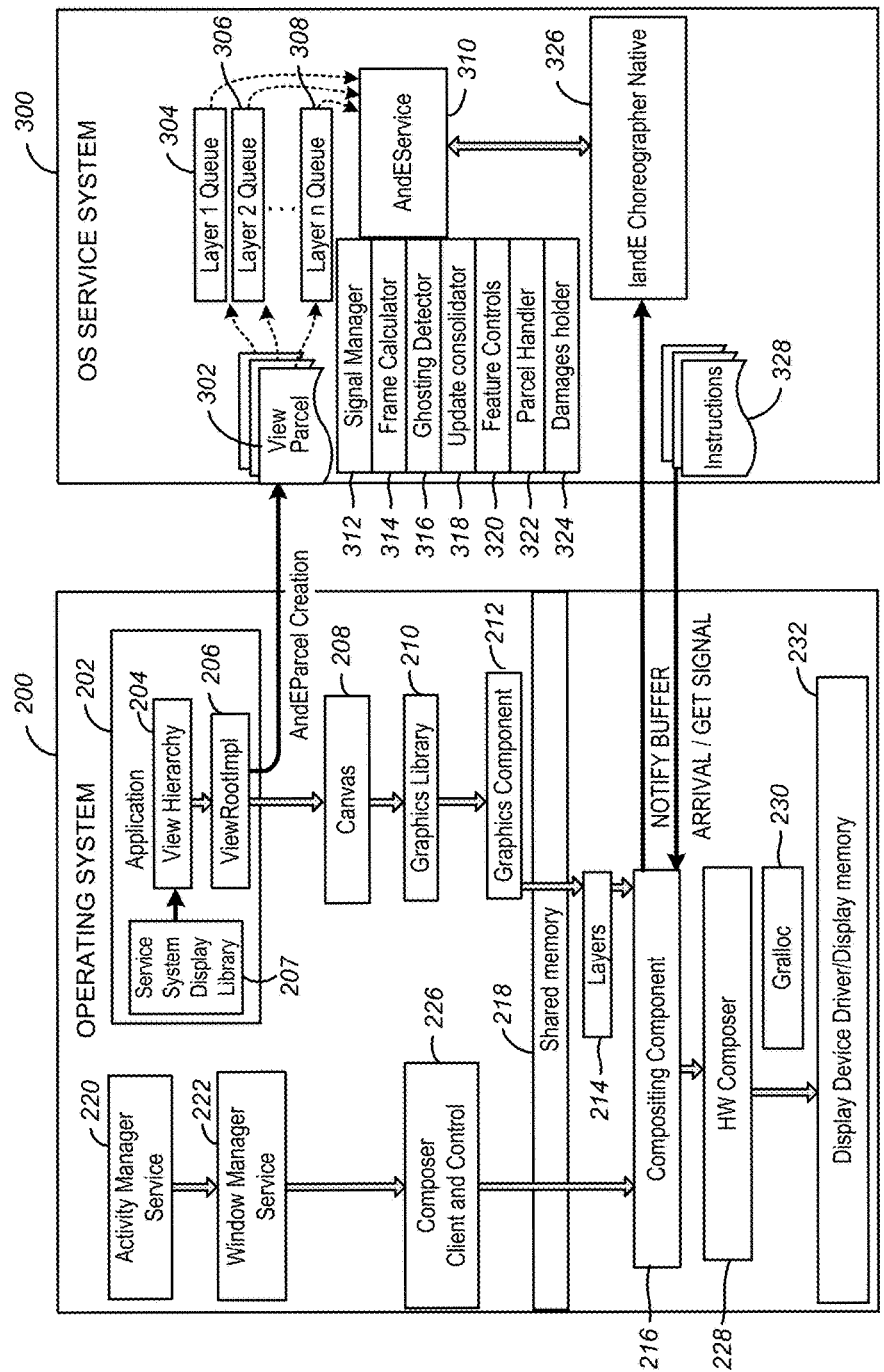
FIG. 3A illustrates an example OS service system utilized in support of the OS running on the electronic device, in accordance with various embodiments.

Accordingly, in certain embodiments, it may be useful to provide to OS service system 300 to supplement and support the OS 200 as illustrated in FIG. 3A. Specifically, the OS service system 300 may include layer queues 304 (e.g., "Layer 1 Queue"), 306 (e.g., "Layer 2 Queue"), and 308 (e.g., "Layer 3 Queue") for each layer that holds information (e.g., screen orientation, transitions, animations, position, transforms, bounds, animations, widgets, and so forth) about the various views. In some embodiments, the OS service system 300 may include a centralized view on all the canvases across applications. As will be further appreciated, the OS service system 300 may instruct the compositing component 216 (e.g., "SurfaceFlinger") when to post transactions that result in display updates to, for example, the frame buffer of the electronic computing device 100 to be drawn or written to the electronic display 102.

In certain embodiments, the OS service system 300 may provide a provision for views and widgets to specify particular E-ink customizations (e.g., waveforms, update modes, etc.) through a number of view parcels 302. For example, each of the view parcels 302 may correspond to respective views created (e.g., by the application component 202 and/or in response to one or more user events or gestures). The OS service system 300 may hold and modify the view parcels 302, and may ultimately pass one or more of the view parcels 302 to the display device driver/display memory component 232 when frame updates are to occur. As will be further appreciated, the view parcels 302 information may be utilized by the display logic within OS service system 300 to prevent possible "ghosting" image artifacts, "mura" image artifacts, or other image artifacts, for example, from becoming apparent on the electronic display 102.

In certain embodiments, the OS service system 300 may include a number of subcomponents (e.g., software subsystems) that may be useful in providing one or more channels (e.g., soft channels) to provide image updates in support of, or to dynamically transform certain image rendering aspects (e.g., screen orientation, transitions, animations, position, transforms, bounds, animations, views, widgets, and so forth) to be more suitable for display on, for example, an E-ink embodiment of the electronic display 102. In this way, the visual experience and visual desirability of a user of the electronic computing device 100 may be enriched.

For example, as will discussed in further detail below, the OS service system 300 may provide one or more channels (e.g., soft channels) to communicate E-ink dedicated parameters (e.g., waveforms, update modes "wait for complete" flags, and so forth) to the display device driver/display memory component 232 that may be utilized used by the display device driver/display memory component 232 in support of, or to dynamically transform certain image rendering aspects (e.g., screen orientation, transitions, animations, position, transforms, bounds, animations, views, widgets, and so forth) to be more suitable for display on, for example, an E-ink embodiment of the electronic display 102. The OS service system 300 may also allow only minimal image frame updates (e.g., at a reduced refresh rate and/or frame rate) to the electronic display 102. The OS service system 300 may further consolidate as many frame updates as possible, such that necessary frame updates occur, for example, in a synchronized manner. For example, in this way, partial frame updates and full frame updates (e.g., complete refreshes) may be selective in order to reduce or substantially eliminate any possible "ghosting" or "mura" image artifacts.

In certain embodiments, the subcomponents (e.g., software subsystems) of the OS service system 300 may include a service subcomponent 310 (e.g., "AndEservice"), a signal manager subcomponent 312, a frame calculator subcomponent 314, a "ghosting" detector subcomponent 316, an update consolidator subcomponent 318, a feature control subcomponent 320, a parcel handler subcomponent 322 (e.g., "Parcel Handler"), a damages holder subcomponent 324, and a native subcomponent 326. In certain embodiments, the signal manager subcomponent 312 may be provided to allow the OS service system 300 to communicate with the compositing component 216 (e.g., "SurfaceFlinger") through providing various signals. For example, the signals provided to the compositing component 216 (e.g., "SurfaceFlinger") by the signal manager subcomponent 312 may assist the compositing component 216 (e.g., "SurfaceFlinger") in deciding, for example, whether to delay or skip a certain frame update, proceed in providing a certain frame update, or whether to provide a complete refresh.

In certain embodiments, the signal manager subcomponent 312 may perform signal calculations based on, for example, the state of each of the layer queues 304 (e.g., "Layer 1 Queue"), 306 (e.g., "Layer 2 Queue"), and 308 (e.g., "Layer 3 Queue"). For example, for a particular layer queue 304, 306, and 308, it may be possible to learn (e.g., via one or more modules of the root view component 206) whether the particular canvas creations are based on animations (e.g., by extracting this information from the view parcels 302). The service subcomponent 310 (e.g., "AndEservice") may then decide to hold or skip the frame updates to prevent the animations. Similarly, in some embodiments, service subcomponent 310 (e.g., "AndEservice") may identify certain use cases (e.g., "Menu Dismiss" use case), and may then provide a signal to the display device driver/display memory component 232 to perform a full refresh (e.g., refresh of an entire image or page displayed on the electronic display 102).

In certain embodiments, the frame calculator subcomponent 314 and the update consolidator subcomponent 318 may operate in conjunction. For example, for each view bound with respect to a particular displayed software application, the frame calculator subcomponent 314 and the update consolidator subcomponent 318 may determine whether there are one or more overlapping or gratuitous views that are expected to be updated. The frame calculator subcomponent 314 and the update consolidator subcomponent 318 may then use this information to decide on whether one or more particular frames should be skipped or provided. Furthermore, in some embodiments, in which, for example, a button widget (e.g., or other displayable or selectable graphical element or animation) is depressed within a displayed software application, the button widget may indicate to the frame calculator subcomponent 314 and the update consolidator subcomponent 318 a hint attribute.

The frame calculator subcomponent 314 and the update consolidator subcomponent 318 may then determine that only the button widget is to be drawn (e.g., via a partial frame refresh or a refresh of only the lines or groups of pixels of the canvas corresponding to the button widget) based on the hint attribute. That is, the frame updates may be selective and/or on an as-needed basis (e.g., as opposed to frequently or even periodically), and thus the visual experience of a user of the electronic computing device 100 may be enriched and there may be less possibility of flicker, "ghosting", "mura", or other image artifacts. Similarly, in some embodiments, based on the view attribute, the frame calculator subcomponent 314 and the update consolidator subcomponent 318 may decide whether a previous view or image rendering frame update was redundant or due to a superfluous animation, and then determine to skip that particular frame update.

In certain embodiments, as previously discussed, the OS service system 300 may also include a "ghosting" detector subcomponent 316. As may be appreciated, the "ghosting" detector subcomponent 316 may be provided to reduce or substantially eliminate the possibility of flicker, "ghosting", "mura", or other image artifacts from becoming apparent on the electronic display 102. For example, in certain embodiments, the "ghosting" detector subcomponent 316 may be provided to know when to execute a complete refresh of the electronic display 102. Specifically, the "ghosting" detector subcomponent 316 may include an application programming interface (API) in which a developer or user may program one or more pixel charge accumulation threshold percentage for which one or more frame updates may be executed.

In some embodiments, pixel charge accumulation and the image artifacts (e.g., "ghosting") resulting therefrom in E-ink displays may be understood to refer to the "sticking" (e.g., one or more pixels remaining substantially white longer than desirable when switched to substantially black, and/or vice-versa) of pixels that may occur due to some amount of charge that may remain present for some amount of time (e.g., seconds) after pixels are switched, for example, from substantially white to substantially black. In some embodiments, this phenomenon in E-ink displays may equally be described as the result of black and/or white ink particles or microcapsules not being reoriented or repositioned fast enough (e.g., due to charge accumulation on the pixels or an accumulation of black particles or microcapsules being undesirably mixed with the white particles or microcapsules when switched) when a voltage or charge is applied to transition the display from black to white, or vice-versa.

Indeed, because flicker, "ghosting", "mura", or other image artifacts becoming apparent on the display 102 may in some cases be primarily due to charge accumulation between display pixels (e.g., charge accumulation between black [G0] and white [G16] display pixels when switched from "ON" to "OFF"), it may be useful to track accumulated charges on the display pixels of the electronic display 102. For example, in some embodiments, the "ghosting" detector subcomponent 316 may trigger a full frame update (e.g., refresh of an entire image or page displayed on the electronic display 102) when, for example, the accumulated charges on display pixels corresponding to one or more view areas of a canvas reaches one or more user-configurable threshold values (e.g., a positive pixel charge threshold value and a negative pixel charge threshold value).

For instance, for a display pixel charge accumulation threshold of, for example, 50%, then once the display pixels reaches 50% charge accumulation (e.g., 50% negative charge or 50% positive charge accumulation), a full frame update (e.g., refresh of an entire image or canvas displayed on the electronic display 102) will be executed. In one embodiment, the 50% pixel charge accumulation threshold may correspond to a 50% pixel charge accumulation on individual display pixels, or, in another embodiment, may correspond to a cumulative pixel charge accumulation in which each of a number (e.g., 5) display pixels accumulate a charge of 10%, for instance. In another embodiment, the pixel charge accumulation threshold may be a percentage value that may be set above 100%. For example, in such a case in which the pixel charge accumulation threshold is set 300%, then once the display pixels reaches 300% charge accumulation (e.g., 300% negative charge or 300% positive charge accumulation), a full frame update will be executed.

In another embodiment, the "ghosting" detector subcomponent 316 may trigger a full frame update (e.g., refresh of an entire image or page displayed on the electronic display 102 to white) based on the number of views drawn on the application 202. For example, the "ghosting" detector subcomponent 316 may track (e.g., by extracting this information from the view parcels 302) the number views drawn, then after a predetermined number (e.g., 10 views drawn, 20 views drawn, and so forth), the "ghosting" detector subcomponent 316 may trigger a full frame update (e.g., refresh of an entire image or page displayed on the electronic display 102 by driving all pixels to white to "wipe clean" the pixels of charge accumulation).

In another embodiment, the "ghosting" detector subcomponent 316 may track (e.g., by extracting this information from the view parcels 302) the number of user-induced events (e.g., gestures like scrolls, swipes, and so forth) on the application component 202. For example, based on the number of detected user events, the "ghosting" detector subcomponent 316 may trigger a full frame update (e.g., after every 5 detected user events, after every 7 detected user events, after every 10 detected user events, after every 12 detected user events, and so forth). Still, in another embodiment, the "ghosting" detector subcomponent 316 may trigger a full frame update based on the ambient temperature detected by the electronic computing device 100. Specifically, for hotter temperatures (e.g., 90 degrees Fahrenheit (F) and above) and for colder temperatures (e.g., 32 degrees F. or below freezing temperatures), the electronic display 102 may be more susceptible to image artifacts (e.g., "ghosting" artifacts.). For example, in one embodiment, for ambient temperatures 90 degrees F. and above, the "ghosting" detector subcomponent 316 may trigger a full frame update.

Likewise, for ambient temperatures 32 degrees F. and below, the "ghosting" detector subcomponent 316 may trigger a full frame update.

In certain embodiments, as further illustrated in FIG. 3A, the OS service system 300 may also include the feature control subcomponent 320. In certain embodiments, the feature control subcomponent 320 may be provided to establish control (e.g., developer or user control) over the various functions such as buffer tracking, executing full frame updates, each of the aforementioned functions performed via the subcomponents 312, 314, 316, 318, 322, 324, and so forth. For example, the feature control subcomponent 320 may allow developers or users to activate (e.g., turn "ON") and deactivate (e.g., turn "OFF") the functions of the OS service system 300. In this way, a developer or a user, for example, may be allowed to selectively activate or disable the various functionality of the OS service system 300 at runtime. In some embodiments, the feature control subcomponent 320 may also include one or more APIs that may allow a developer or a user, for example, to clear the queues of the feature control subcomponent 320, or to deactivate the OS service system 300 completely (e.g., based on developer or user preferences).

In certain embodiments, as also illustrated by FIG. 3A, the OS service system 300 may also include the SurfaceFlinger parcel handler subcomponent 322 (e.g., "SFParcel Handler"). The SurfaceFlinger parcel handler subcomponent 322 (e.g., "SFParcel Handler") may include one or more APIs including a stop-and-wait protocol, which may be used, for example, by the window manager service component 222 to indicate when a particular viewport (e.g., window) is created or removed, or opened or closed. In some embodiments, to avoid redundant or gratuitous frame updates in such cases, the service subcomponent 310 (e.g., "AndEservice") cause these particular display parcels may be held by or stored into the holder component 324 until one or more frame updates are determined by the service subcomponent 310 (e.g., "AndEservice") to be necessary.

Figure 3B:
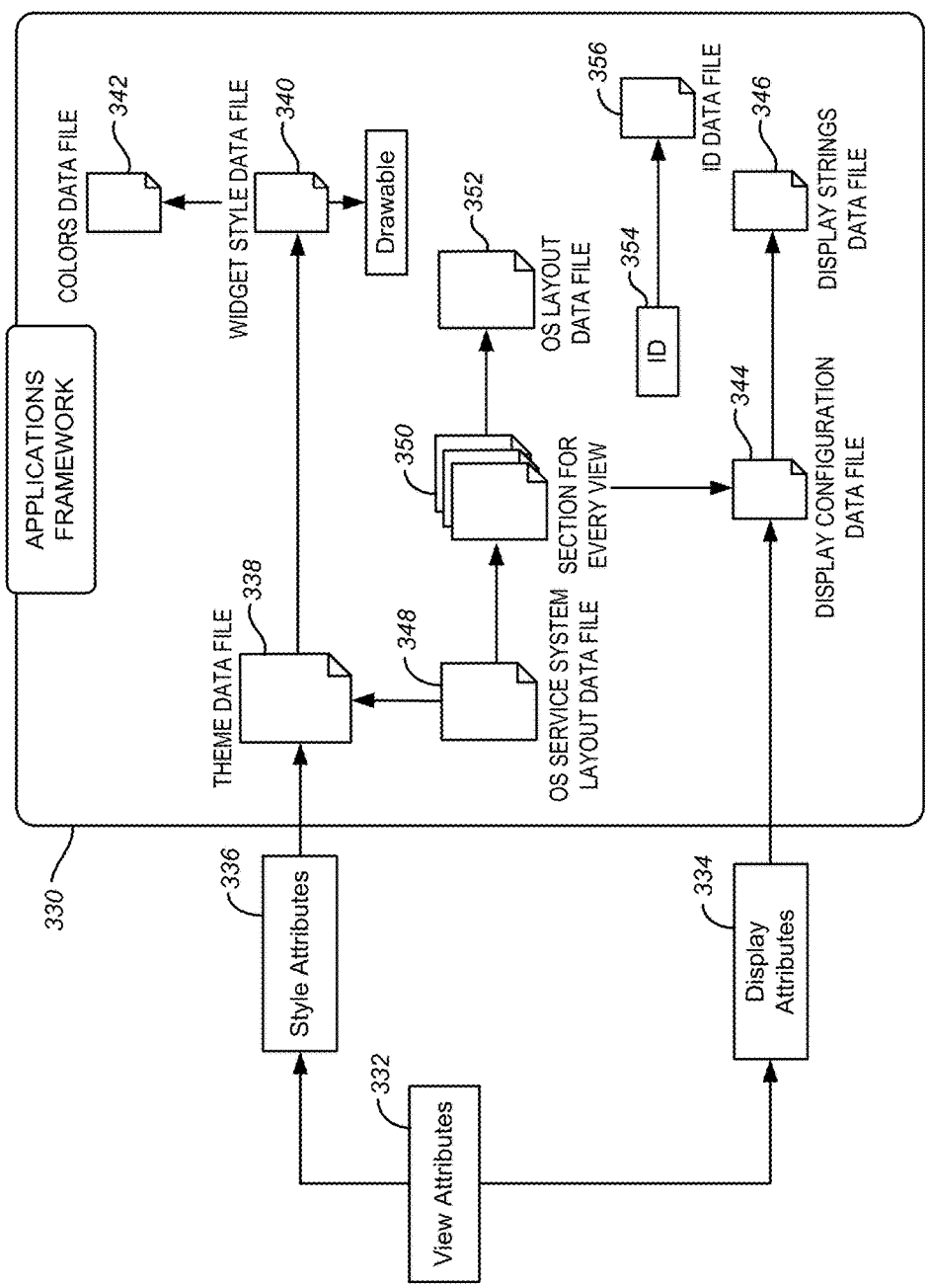
FIG. 3B illustrates an example applications framework, in accordance with various embodiments.

FIG. 3B illustrates an applications framework 330 that may, in some embodiments, operate as part of the root view component 206 (e.g., "ViewRootImpl"), or, in other embodiments, operate as part of the service subcomponent 310 (e.g., "AndEservice"). For example, FIG. 3B illustrates the manner in which the view attributes 332, including E-ink display attribute parameters 334 and E-ink style attribute parameters 336, are stored and presented. Specifically, the E-ink display attribute parameters 334 may include display attributes such as waveforms and update modes to control the way in which images are rendered on the electronic display 102. The E-ink style attribute parameters 336 may include, for example, the "look" (e.g., the perceptible appearance) and "feel" (e.g., the perceptible tactility) of widgets or other rendering aspects to be transformed into style attributes more suitable for display on an E-ink embodiment of the electronic display 102.

For example, as illustrated in FIG. 3B, the E-ink style attribute parameters 336 may be extracted and stored as part of a theme data file 338, a widget data file 340, and a colors data file 342. As will be further appreciated with respect to FIG. 7 below, the theme data file 338, a widget data file 340, and a colors data file 342 may collectively be used to store and make available the E-ink style attribute parameters for transforming certain styles of rendering aspects in into styles (e.g., color, theme, shape, type, function, and so forth) of rendering aspects more suitable for display on an E-ink embodiment of the electronic display 102.

Similarly, the E-ink display attribute parameters 334 may be extracted and stored as part of a display configuration data file 344 and a display strings data file 346. As will be further appreciated with respect to FIG. 6 below, the display configuration data file 344 and the display strings data file 346 may collectively be used to store and be make available the E-ink view attribute parameters for providing, for example, waveforms, frame update modes, write modes, and so forth to generate rendering aspects more suitable for display on an E-ink embodiment of the electronic display 102.

The applications framework 330 may also include the OS layout data file 348, view sections 350, OS service system layout data file 352, an identification (ID) tag component 354, and view identification data file 354. The OS layout data file 348 and OS service system layout data file 352 may be used to store certain layouts and/or view canvases for the OS 200 and the OS service system 300, respectively. The ID tag component 354 and view identification data file 354 may be used to identify and keep track of a number views processed or to be processed via the applications framework 330. It should be appreciated that each of the aforementioned data files may, in some embodiments, include eXtensible Mark-up Language (XML) data files that may be relied upon to transform various rendering aspects into E-ink rendering aspects suitable to be displayed on an E-ink embodiment of the electronic display 102.

Figure 4:
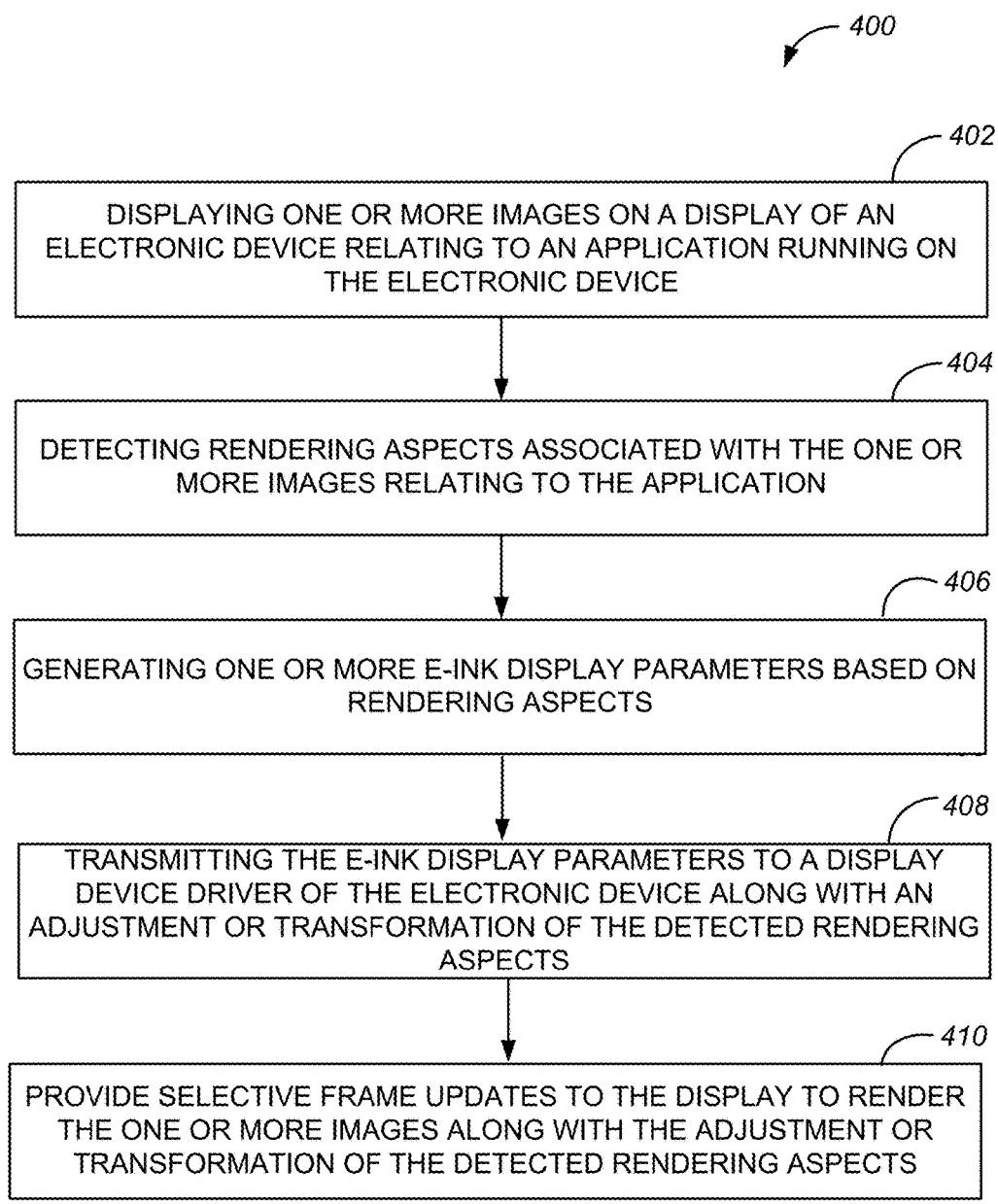
FIG. 4 illustrates a flowchart of an example process useful in providing selective frame updates to an E-ink display of the electronic device, in accordance with various embodiments.

Turning now to FIG. 4, a flowchart illustrating a process 400 useful in providing one or more channels (e.g., soft channels) to provide selective frame updates in support of presenting certain image rendering aspects on, for example, an E-ink embodiment of the electronic display 102. Although this and other figures may depict example processes of various embodiments in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

The process 400 may begin with the electronic computing device 100 displaying one or more images on an electronic display of an electronic device relating to an application running on the electronic device (block 402). For example, as discussed above with respect to FIG. 3A, the OS 200 may support an application component 202 that may include various views and images and the view hierarchy 204.

The process 400 may continue with electronic computing device 100 detecting rendering aspects associated with the one or more images relating to the application (block 404). Specifically, as previously discussed, the OS service system 300 of the electronic computing device 100 may receive a number of view parcels 302 via a hook (e.g., software instructions) into the root view component 206 (e.g., "ViewRootImpl"), for example, at a canvas creation point of the application component 202.

For example, as discussed above with respect to FIG. 3A, the service subcomponent 310 (e.g., "AndEservice") of the OS service system 300 may extract information from the root view component 206 via the view parcels 302. The information may include, for example, various views that may be drawn as part of a canvas, display information (e.g., bounds, animation states) for each view, and so forth. In some embodiments, the service subcomponent 310 (e.g., "AndEservice") may identify each received view by a unique E-ink view identification, and the individual view parcels 302 may be identified by an assigned activity name and application name.

The process 400 may continue with electronic computing device 100 generating one or more E-ink display parameters based on the rendering aspects (block 406). For example, based on the display information (e.g., bounds, animation states, widgets, and so forth), the service subcomponent 310 (e.g., "AndEservice") may generate one or more display instructions 328 including, for example, E-ink specific display information (e.g., waveforms, frame update modes, sensitivity, and so forth) corresponding to the display information (e.g., bounds, animation states, widgets, and so forth) received via the view parcels 302.

The process 400 may continue with the electronic computing device 100 transmitting the E-ink display parameters to a display device driver of the electronic computing device 100 along with an adjustment or transformation to render the one or more images with an adjustment or transformation to the detected rendering aspects (block 408). For example, in response to receiving a call from the compositing component 216 (e.g., "SurfaceFlinger"), the service subcomponent 310 (e.g., "AndEservice") may analyze the request, and for each view and corresponding bound, transmit a respective waveform, frame update mode, and write modes to be supplied to the display device driver/display memory component 232.

The process 400 may then continue with the electronic computing device 100 providing selective frame updates to the electronic display to render the one or more images along with the adjustment to the detected rendering aspects (block 410). For example, based on the transmission instructions 328 received from the service subcomponent 310 (e.g., "AndEservice"), the compositing component 216 (e.g., "SurfaceFlinger") may determine whether to supply frame updates to the display device driver/display memory component 232, and, by extension, to the frame buffer of the electronic display 102. For example, in some embodiments, the transmission instructions 328 from the service subcomponent 310 (e.g., "AndEservice") to the compositing component 216 (e.g., "SurfaceFlinger") may include a hold or delay frame update instruction signal, a release frame instruction signal, or a full frame update instruction signal.

In certain embodiments, for example, if the compositing component 216 (e.g., "SurfaceFlinger") receives hold or delay frame update instruction signal, the compositing component 216 (e.g., "SurfaceFlinger") may not supply frame updates to the display device driver/display memory component 232 (e.g., temporarily or for one or more pixel data write time cycles). On the other hand, for example, should the compositing component 216 (e.g., "SurfaceFlinger") receive a release frame instruction signal, then the compositing component 216 (e.g., "SurfaceFlinger") may supply frame updates to the display device driver/display memory component 232 (e.g., a refresh of one or more lines of display pixels or groups of display pixels).

Lastly, should the compositing component 216 (e.g., "SurfaceFlinger") receive a full frame update instruction signal, for example, the compositing component 216 (e.g., "SurfaceFlinger") may supply a full frame update to the display device driver/display memory component 232 (e.g., a complete refresh of a page or canvas). As previously discussed, a full frame update, for example, may be selectively supplied to the compositing component 216 (e.g., "SurfaceFlinger") as a technique to reduce or to substantially eliminate any possibility of image artifacts (e.g., flicker, "ghosting", "mura", and so forth) becoming apparent on the electronic display 102.

Figure 5:
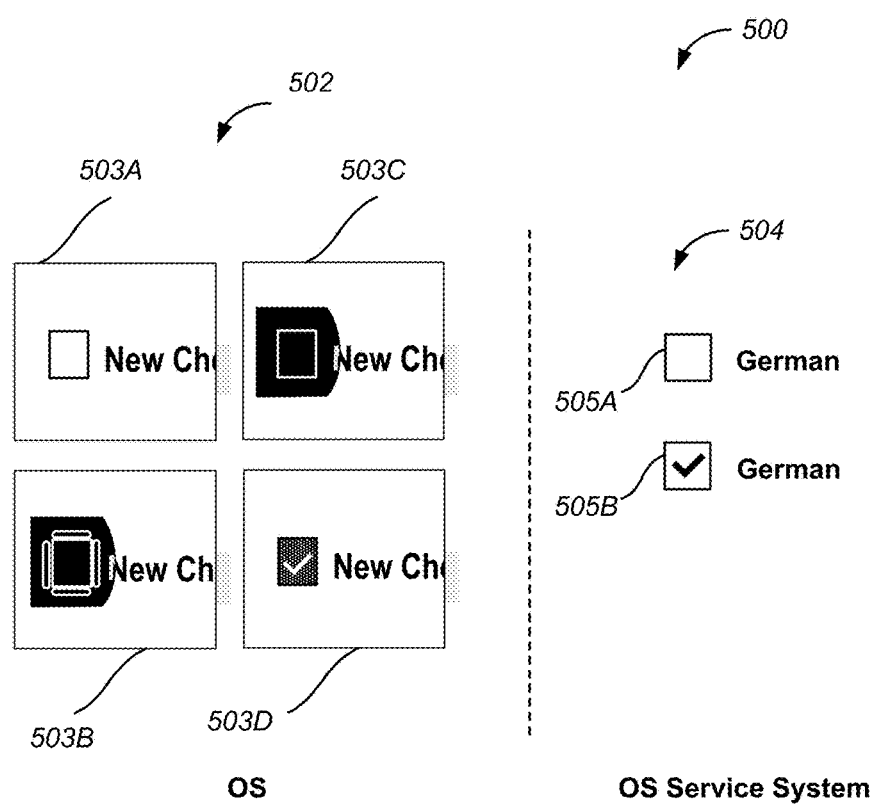
FIG. 5 illustrates example application layouts, in accordance with various embodiments.

FIG. 5 illustrates an example layout 500 of the present techniques. Specifically, FIG. 5 depicts a comparison of a layout 502 of an application suitable to be presented on, for example, an LCD and/or AMOLED embodiment of the electronic display 102 and a layout 504 adjusted, for example, for an E-ink embodiment of the electronic display 102 in accordance with the present techniques. As illustrated, the layout 502 may include a number of widgets including checkboxes. Specifically, the layout 502 depicts each of four transition states 503A, 503B, 503C, and 503D for a checkbox widget transitioning, for example, from displaying an unchecked box to displaying a checked box. Such a widget as displayed by the layout 502 may require four or more frame updates, which may be suitable for an LCD and/or AMOLED embodiment of the electronic display 102, but not very suitable for an E-ink embodiment of the electronic display 102.

In contrast, the layout 504 may include a number of widgets including checkboxes, for example, in which the widgets or other rendering aspects have been dynamically transformed or adjusted by the OS service system 300 into a form more suitable to be displayed on an E-ink embodiment of the electronic display 102. As depicted, the layout 504 may include only two transition states 505A and 505B, and thus the number of frame updates that may be necessary may be reduced in accordance with the present techniques. In this way, although an E-ink embodiment of the electronic display 102 may not be technologically suited to display widgets such as the layout 502, the present techniques may allow the layout 502 of widgets or other animations and transitions to be dynamically transformed into a displayable form more suitable for a display E-ink embodiment of the electronic display 102. Thus, the present techniques may improve user visual desirability and visual effects when using E-ink displays.

Figure 6:
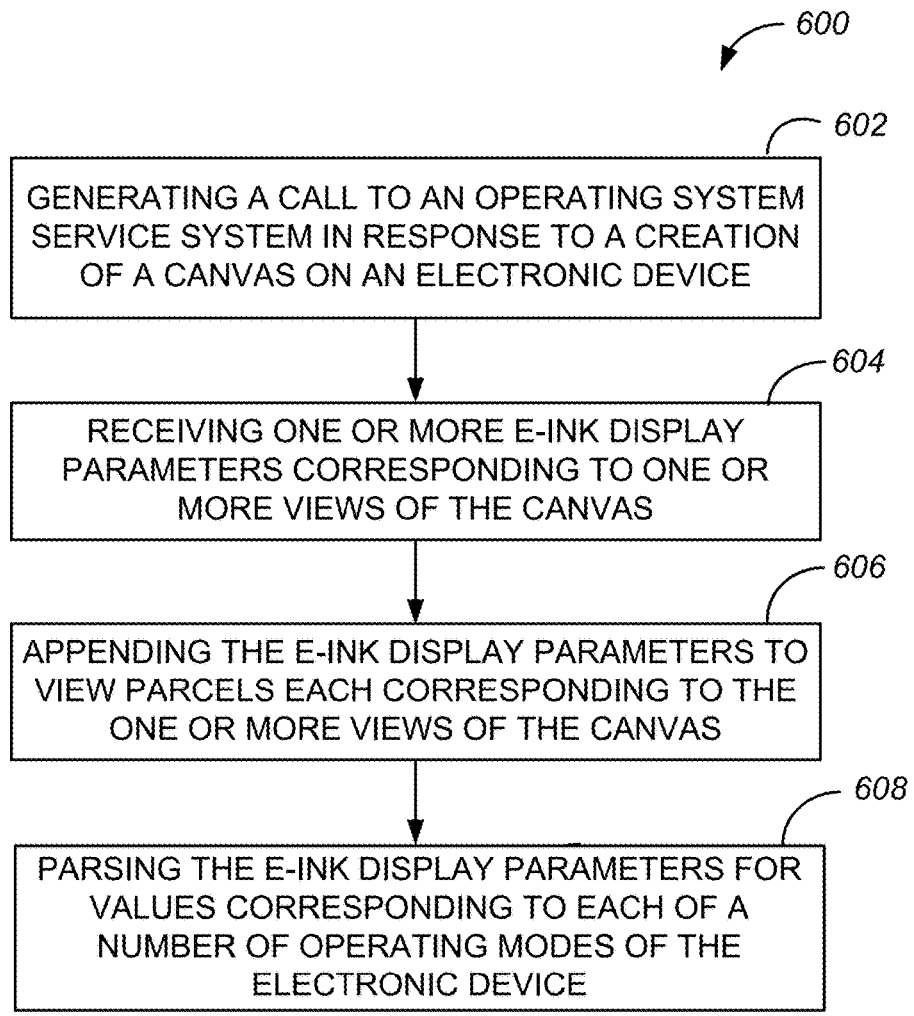
FIG. 6 illustrates a flowchart of an example process useful in processing E-ink view attribute parameters, in accordance with various embodiments.

FIG. 6 is a flowchart illustrating a process 600 useful in processing view attribute parameters of the OS 200 and/or OS service system 300. The process 600 may begin generating a call to an OS service system in response to a creation of a canvas on an electronic device (block 602). For example, the root view component 206 (e.g., "ViewRootlmpl") may generate a call to the OS service system 300 at the completion of each canvas that is created. In some embodiments, as generally discussed above, for each object or image that is created via the canvas component 208, the root view component 206 (e.g., "ViewRootlmpl") may extract information about the E-ink display and store the information into the view parcels 302.

The process 600 may continue with receiving one or more E-ink display parameters corresponding to one or more views of the canvas (block 604). For example, in some embodiments, for each draw call executed, the associated E-ink display parameters may be retrieved by the root view component 206 (e.g., "ViewRootlmpl") from the OS service system 300. The process 600 may continue with appending the E-ink display parameters corresponding to the one or more views of the canvas (block 606). For example, the root view component 206 (e.g., "ViewRootlmpl") may append the E-ink display parameters to the view parcels 302.

The process 600 may then continue with parsing the E-ink display parameters for values corresponding to each of a number of operating modes of the electronic device (block 608). For example, in certain embodiments, the root view component 206 (e.g., "ViewRootlmpl") in conjunction with the view hierarchy may parse the E-ink display parameters for a number of assigned values corresponding to, for example, an E-ink waveform (e.g., assigned a value of "W"), a frame update (e.g., assigned a value of "UM"), and a data write (e.g., assigned a value of "WM"). In some embodiments, the modes may include a generic display mode, a reader display mode, and a listview display mode. For each of the aforementioned display modes, the service subcomponent 310 (e.g., "AndEservice") may provide a prescribe set of respective E-ink display parameters (e.g., waveform, frame update, data write mode) and transmit the prescribe set of respective E-ink display parameters for the display modes to the root view component 206 (e.g., "ViewRootlmpl").

Figure 7:
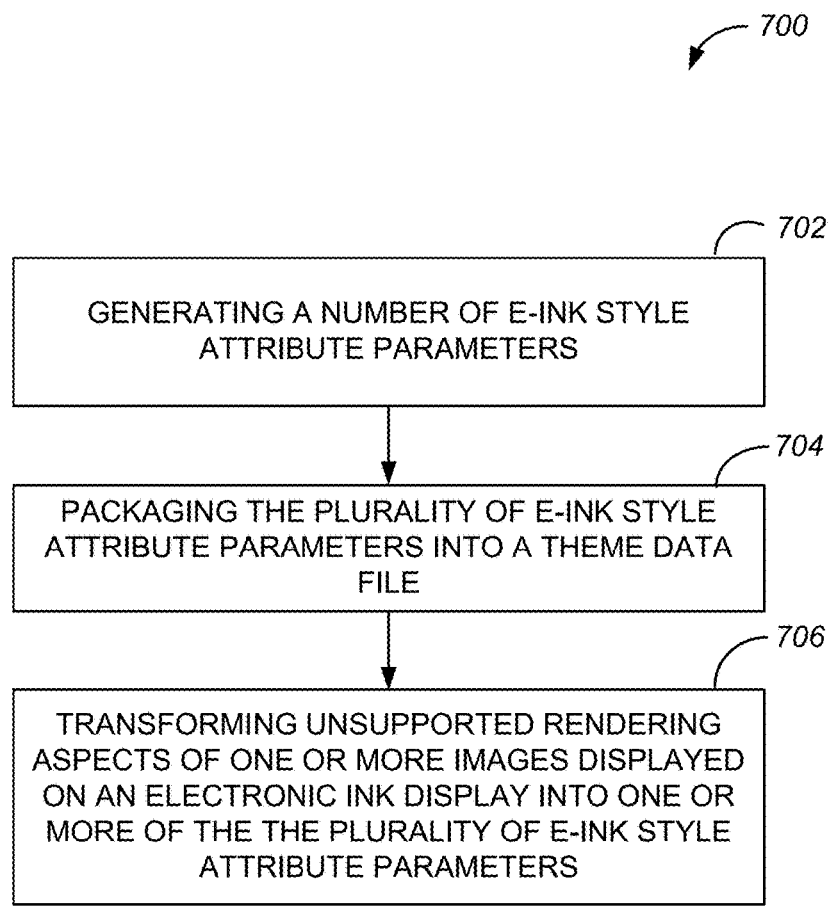
FIG. 7 illustrates a flowchart of an example process useful in processing E-ink style attribute parameters, in accordance with various embodiments.

FIG. 7 is a flow diagram illustrating an embodiment of a process 700 useful in useful in processing style attribute parameters of the OS 200 and/or OS service system 300. The E-ink style attribute parameters may include, for example, attributes related to the "look and "feel" of certain widgets, animations, or rendering aspects. Specifically, the process 700 may be useful in identifying and transforming certain style attributes for the rendering aspects (e.g., widgets, animations, windows, transitions, and so forth) to style attributes suitable to be display on an E-ink embodiment of the electronic display 102.

The process 700 may begin generating a number of E-ink style attribute parameters (block 702). The process 700 may then continue with packaging the number of E-ink style attribute parameters into a theme data file (block 704). For example, a number of E-ink style attribute parameters may be generated and packaged or stored as part of the theme data file 338, for example, to be accessible to developers or users. The process 700 may then continue transforming unsupportable rendering aspects of one or more images displayed on an E-ink display into one or more of the number E-ink style attributes parameters (block 706). In this way, the rendering aspects (e.g., widgets, animations, transitions, and so forth) may E-ink specific, and thus may be suitable for display on an E-ink embodiment of the electronic display 102.

Figure 8:
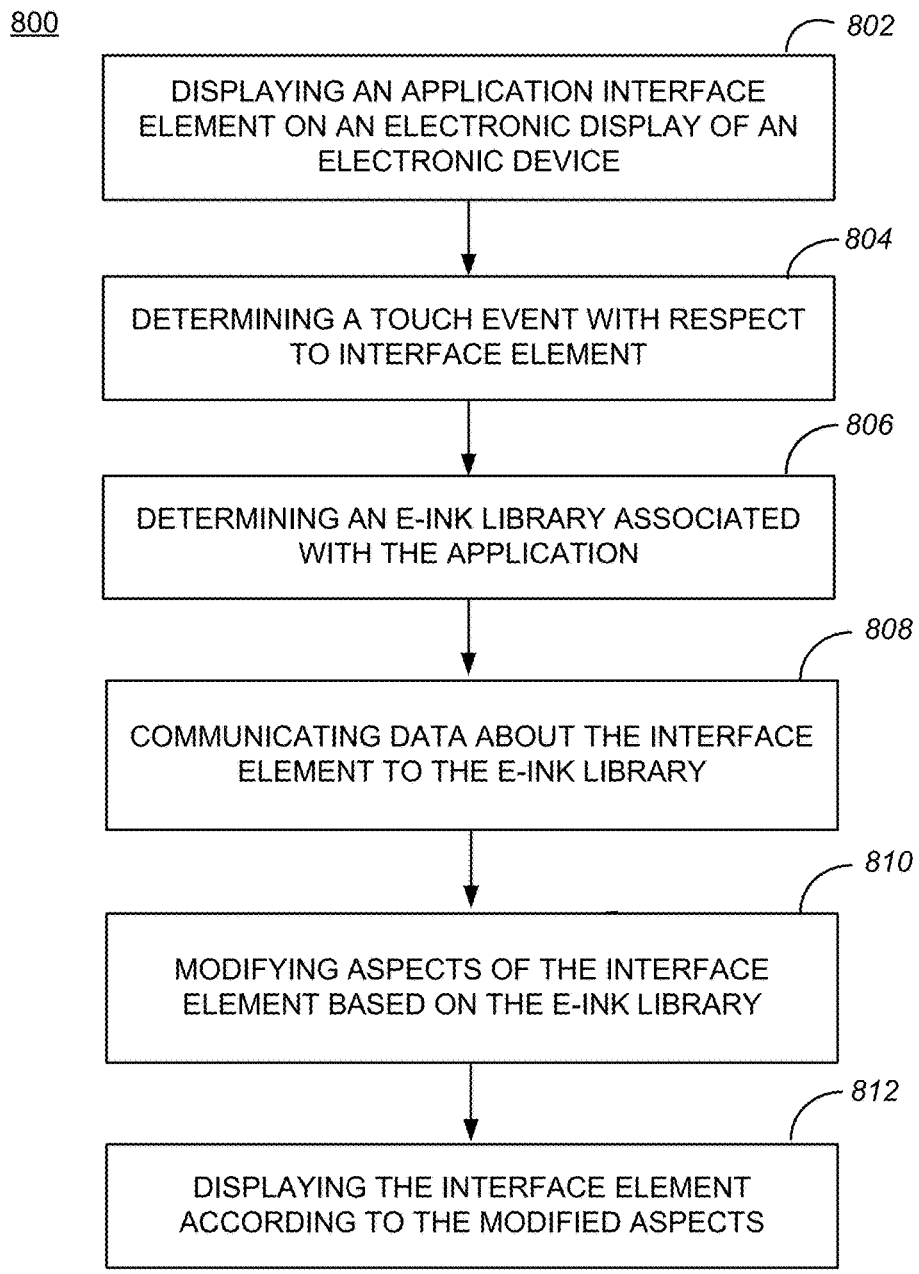
FIG. 8 illustrates a flowchart of an example process useful in processing and responding to events occurring on an E-ink display, in accordance with various embodiments.

FIG. 8 is a flowchart illustrating a process 800 useful in processing and responding to events occurring on an E-ink embodiment of the electronic display 102. Specifically, certain widgets, which may be or have interface elements associated therewith, such as scrolling and/or sliding, may not be suitable for an E-ink embodiment of the electronic display 102 because, among other reasons, such widgets may warrant frequent frame updates and/or have visual feedback that does not work well with E-ink screens. Similarly, many widgets may respond to certain touch events or other user events with visual effects such as ripple, which may also warrant frequent frame updates. Thus, the present techniques may detect and analyze the touch event, and transform any rendering effect associated with the touch effect into a form more suitable for display on an E-ink embodiment of the electronic display 102.

The process 800 may begin with displaying an interface element associated with an application executing on an electronic device on an electronic display of the device (block 802). The process 800 may continue with determining a touch event (e.g., press, long press, swipe, gesture, etc.) or other interaction, such as with the widget and/or the interface element (block 804). For example, a user may perform one or more physical touches or hovers on or about a canvas, for example, displayed on the electronic display 102. The process 800 may continue with determining an E-ink library associated with the application or otherwise stored on or accessible from the electronic device. (block 806). As described herein, an E-ink library may comprise functions, routines, parameters, etc., associated with E-ink rendering aspects that cause graphics to be rendered or otherwise generated and displayed on an E-ink display.

For example, in certain embodiments, any of various events or widgets (e.g., scrolling, sliding) or any visual effect (e.g., ripple) originating from a touch event may be detected as a touch event and identified (e.g., the type of event and visual effect associated therewith). The process 800 may then continue with communicating data about the interface element to the E-ink library (block 808). For example, the E-ink library may have a hook into the executing application, such that when the application causes an event, such as requesting to draw to the display, then the E-ink library receives the event or function call and along with it various data (e.g., display parameters, behavior parameters, interface attributes, etc.).

The process 800 may then continue with modifying aspects of the interface element, based on the E-ink library, for example into E-ink display suitable rendering aspects (block 808). Specifically, the applications framework may bypass the initial touch events and transform any rendering aspect response associated with the particular touch event into an E-ink display suitable rendering aspect, or, in another embodiment, may eliminate the unsuitable rendering aspects altogether. This may comprise modifying aspects of the interface element, such as the data passed to the E-ink library, based on various data in the E-ink library. The process 800 may then continue displaying the canvas and/or interface element according to the modified aspects of the interface element (block 810).

Figure 9:
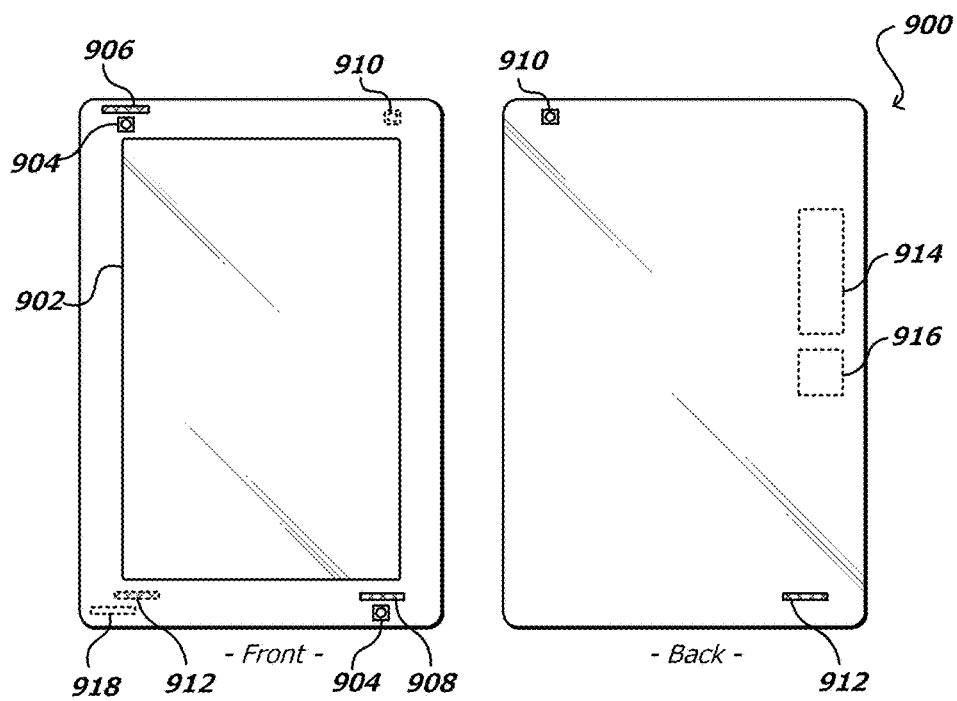
FIG. 9 illustrates front and back views of an example portable computing device that can be used in accordance with various embodiments.

FIG. 9 illustrates front and back views of an example electronic computing device 900 that can be used in accordance with various embodiments, for example, a mobile device configured for adjustable color temperature illumination using the techniques described herein. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 900 has a display screen 902 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 904 on the front of the device and at least one image capture element 910 on the back of the device. It should be understood, however, that image capture elements could also, or alternatively, be placed on the sides or corners of the device, and that there can be any appropriate number of capture elements of similar or different types. Each image capture element 904 and 910 may be, for example, a camera, a charge-coupled device (CCD), a motion detection sensor or an infrared sensor, or other image capturing technology.

As discussed, the device can use the images (e.g., still or video) captured from the imaging elements 904 and 910 to generate a three-dimensional simulation of the surrounding environment (e.g., a virtual reality of the surrounding environment for display on the display element of the device). Further, the device can utilize outputs from at least one of the image capture elements 904 and 910 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 908 on the front side, one microphone 912 on the back, and one microphone 906 on or near a top or side of the device. In some devices there may be only one microphone, while in other devices there might be at least one microphone on each side and/or corner of the device, or in other appropriate locations.

The device 900 in this example also includes one or more orientation- or position-determining elements 918 operable to provide information such as a position, direction, motion, or orientation of the device. These elements can include, for example, accelerometers, inertial sensors, electronic gyroscopes, and electronic compasses.

The example device also includes at least one communication mechanism 914, such as may include at least one wired or wireless component operable to communicate with one or more electronic devices. The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

Figure 10:
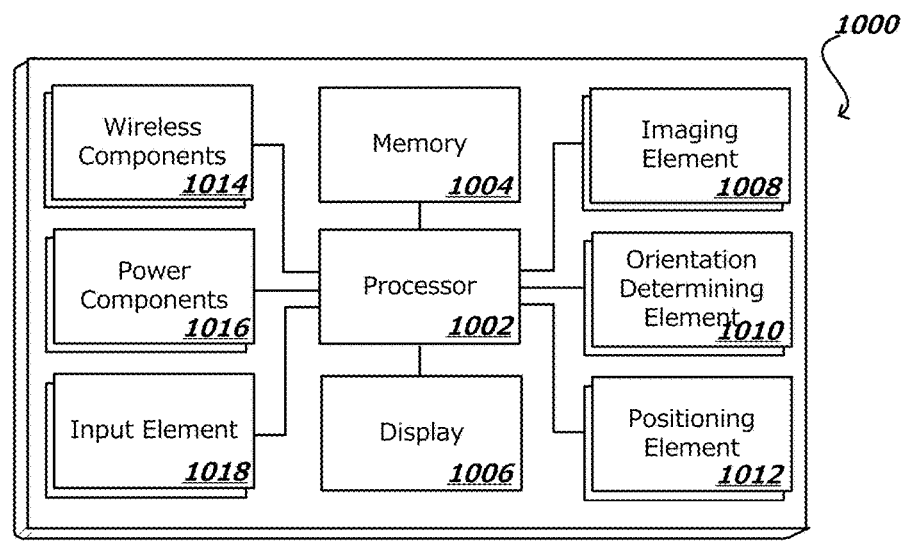
FIG. 10 illustrates an example set of basic components of a portable computing device, such as the device described with respect to FIG. 9.

FIG. 10 illustrates a set of basic components of an electronic computing device 1000 such as the device 900 described with respect to FIG. 9. In this example, the device includes at least one processing unit 1002 for executing instructions that can be stored in a memory device or element 1004. As would be apparent to one of ordinary skill in the art, the device can include many types of memory, data storage, or computer-readable media, such as a first data storage for program instructions for execution by the processing unit(s) 1002, the same or separate storage can be used for images or data, a removable memory can be available for sharing information with other devices, and any number of communication approaches can be available for sharing with other devices.

The device typically will include some type of display element 1006, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1008, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1000 also includes at least one orientation determining element 1010 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1000. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1012 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1014 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1018 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 11:
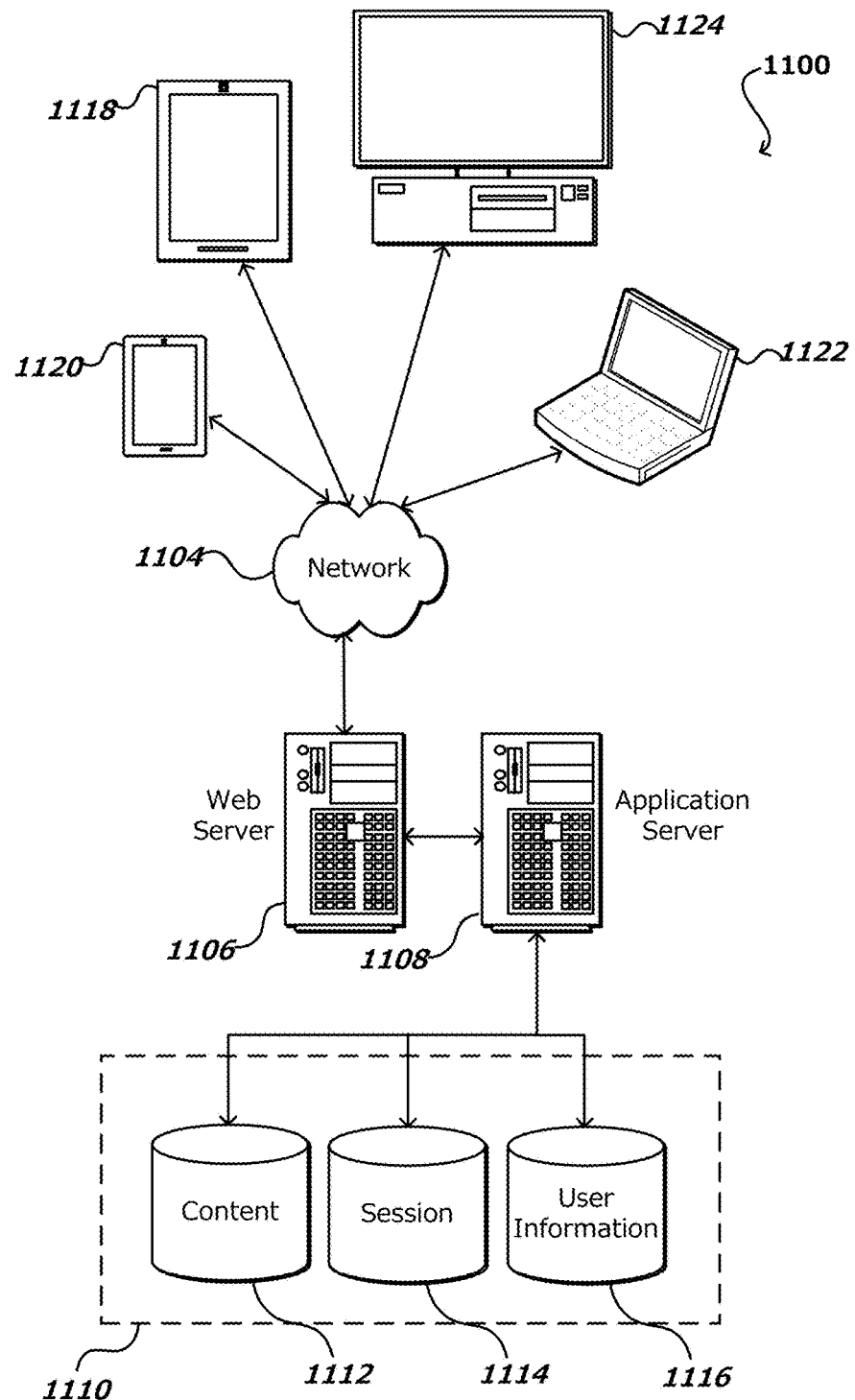
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes electronic client devices 1118, 1120, 1122, and 1124, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client devices 1118, 1120, 1122, and 1124 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1118, 1120, 1122 and 1124. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Various systems, devices, methods, and approaches described herein may be implemented on one or more general-purpose and/or specific computing devices, such as under the control of one or more computer systems configured with executable instructions, the computer systems for example having one or more processors which may be communicatively coupled to other components such as one or more memory units that may store the instructions for execution. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
    an electrophoretic ink (e-ink) screen; and
    at least one processor and a memory including instructions that, when executed by the at least one processor, cause the computing device to:
        receive an instruction from an application executing on the device to display a first interface element on the screen, the interface element being of a first type;
        cause, in response to the instruction, the first interface element to be displayed on the screen, wherein the first interface element is associated with a first set of interface attributes;
        determine a touch event on the screen associated with the first interface element;
        determine, in response to the touch event, that an e-ink library is associated with the application, wherein the e-ink library comprises e-ink display attributes;
        communicate the first type and the first set of interface attributes to the e-ink library;
        determine a first set of e-ink display attributes of the e-ink display attributes, the first set of e-ink display attributes corresponding to the first interface element based on the first type;
        generate a modified first set of interface attributes for the first interface element, the modified first set of interface attributes being based on at least one of the first set of e-ink display attributes; and
        communicate the modified first set of interface attributes to the application to be applied to the first interface element.

2. The computing device of claim 1, further comprising instructions that, when executed by the at least one processor, cause the computing device to:
    determine, by the e-ink library, that the first interface element comprises a visual effect that would result in a plurality of display updates of the screen in response to the touch event;
    select, for the first set of e-ink display attributes, a first e-ink display attribute corresponding to a single display update of the screen; and
    modify, based on the first e-ink display attribute, the visual effect of the first interface element to result in a single display update of the screen.

3. The computing device of claim 1, further comprising instructions that, when executed by the at least one processor, cause the computing device to:
    determine that the first interface element comprises a plurality of pages of information, wherein the wherein the first interface element includes a scrolling visual effect to display the plurality of pages of information;
    determine, by the e-ink library, that the touch event comprises a gesture operable to perform the scrolling visual effect;
    determine a location in the plurality of pages corresponding to the touch event; and
    display the first interface element at a particular page of the plurality of pages based on the location,
    wherein applying the modified first set of interface attributes is operable to change the scrolling visual effect to a pagination visual effect.

4. The computing device of claim 3, wherein the pagination visual effect causes a partial refresh of the screen, and further comprising instructions that, when executed by the at least one processor, cause the computing device to:
    determine a first number of times that the gesture operable to perform the scrolling visual effect has been performed since a last full refresh of the screen;
    determine that the first number of times exceeds a threshold value; and
    cause a full refresh of the screen upon the next gesture operable to perform the scrolling visual effect.

5. A computing device, comprising:
    an electrophoretic ink (e-ink) display screen; and
    at least one processor and a memory including instructions that, when executed by the at least one processor, cause the computing device to:
        detect a request from an application to display an interface element on the screen, wherein the interface element comprises a set of behavior parameters;
        receive an indication of an interaction with the interface element, wherein the interaction is operable to cause visual feedback on the screen according to the set of behavior parameters;

determine that the application is associated with a library comprising a set of e-ink parameters;

modify a subset of the behavior parameters based on the set of e-ink parameters; and cause the visual feedback to be displayed on the screen according to the subset of the behavior parameters.

6. The device of claim 5, further comprising instructions that, when executed by the at least one processor, cause the computing device to:

determine a type of the interaction; and determine the subset of the behavior parameters based on the type of the interaction.

7. The device of claim 6, wherein the type of the interaction comprises a touch gesture and the visual feedback comprises a scrolling effect, and further comprising instructions that, when executed by the at least one processor, cause the computing device to:

determine a location in content associated with the interface element, wherein the location corresponds to the touch gesture, wherein the subset of the behavior parameters cause the visual feedback to comprise a pagination effect, and wherein the interface element displays the content at the location.

8. The device of claim 5, wherein the visual feedback comprises changing a display size of content displayed on the screen and associated with the interface element, and further comprising instructions that, when executed by the at least one processor, cause the computing device to:

determine the subset of behavior parameters associated with a first waveform value;

determine a second waveform value in the set of e-ink parameters; and modify the subset of behavior parameters associated with a first waveform value such that the first waveform value is replaced with the second waveform value.

9. The device of claim 5, further comprising instructions that, when executed by the at least one processor, cause the computing device to:

determine that the interface element is associated with at least one color value in the set of behavior parameters;

determine a mapping between the at least one color value and at least one e-ink parameter of the e-ink parameters; and replace the color value in the set of behavior parameters with the one e-ink parameter.

10. The device of claim 9, wherein the at least one color value comprises a plurality of color values, and further comprising instructions that, when executed by the at least one processor, cause the computing device to:

determine an e-ink theme corresponding to the plurality of color values, wherein the e-ink theme comprises a plurality of grayscale values.

11. The device of claim 5, wherein modifying the subset of the behavior parameters is performed at runtime of the application.

12. The device of claim 5, wherein displaying the visual feedback causes a partial refresh of the screen, and further comprising instructions that, when executed by the at least one processor, cause the computing device to:

determine a first number of indications of an interaction with the interface element have been received since a last full refresh of the screen;

determine that the first number of times exceeds a threshold value; and cause a full refresh of the screen.

13. The device of claim 5, wherein the interaction with the interface element comprises an interaction operable to change a displayed page of an e-book, and wherein the subset of behavior parameters modified based on the set of e-ink parameters comprises waveform data and update mode data.

14. A computer-implemented method, comprising:

detecting a request from an application to display an interface element on an electrophoretic ink (e-ink) display screen of a computing device, wherein the interface element comprises a set of behavior parameters;

receiving an indication of an interaction with the interface element, wherein the interaction is operable to cause visual feedback on the screen according to the set of behavior parameters;

determining that the application is associated with a library comprising a set of e-ink parameters;

modifying a subset of the behavior parameters based on the set of e-ink parameters; and causing the visual feedback to be displayed on the screen according to the subset of the behavior parameters.

15. The method of claim 14, further comprising:

determining a type of the interaction; and determining the subset of the behavior parameters based on the type of the interaction.

16. The method of claim 15, wherein the type of the interaction comprises a touch gesture and the visual feedback comprises a scrolling effect, and further comprising:

determining a location in content associated with the interface element, wherein the location corresponds to the touch gesture, wherein the subset of the behavior parameters cause the visual feedback to comprise a pagination effect, and wherein the interface element displays the content at the location.

17. The method of claim 14, wherein the visual feedback comprises changing a display size of content displayed on the screen and associated with the interface element, and further comprising:

determining the subset of behavior parameters associated with a first waveform value;

determining a second waveform value in the set of e-ink parameters; and modifying the subset of behavior parameters associated with a first waveform value such that the first waveform value is replaced with the second waveform value.

18. The method of claim 14, further comprising:

determining that the interface element is associated with at least one color value in the set of behavior parameters;

determining a mapping between the at least one color value and at least one e-ink parameter of the e-ink parameters; and replacing the color value in the set of behavior parameters with the one e-ink parameter.

19. The method of claim 18, wherein the at least one color value comprises a plurality of color values, and further comprising:

determining an e-ink theme corresponding to the plurality of color values, wherein the e-ink theme comprises a plurality of grayscale values.

20. The method of claim 14, wherein displaying the visual feedback causes a partial refresh of the screen, and further comprising:

determining a first number of indications of an interaction with the interface element have been received since a last full refresh of the screen;

determining that the first number of times exceeds a threshold value; and causing a full refresh of the screen.

\* \* \* \* \*